Feb. 13, 1940.   F. LOEWENBERG   2,190,159
EXPOSURE METER
Filed Nov. 23, 1938
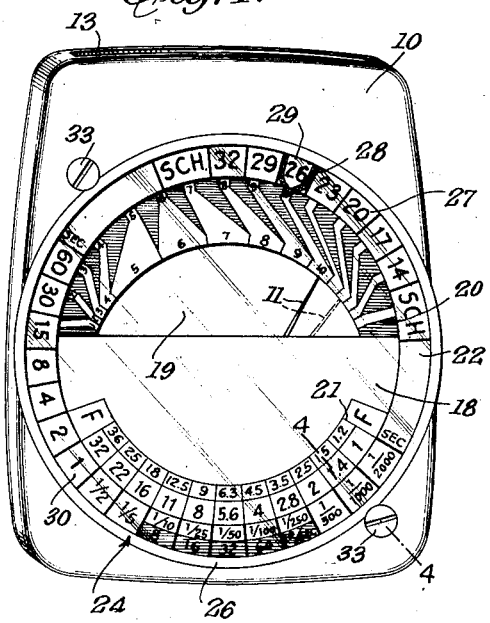
INVENTOR
FRITZ LOEWENBERG
BY
Maxwell E. Sparrow
ATTORNEY Patented Feb. 13, 1940

2,190,159

UNITED STATES PATENT OFFICE 2,190,159

EXPOSURE METER

Fritz Loewenberg, New York, N. Y.

Application November 23, 1938, Serial No. 242,054

11 Claims. (Cl. 88—23)

This invention relates generally to photographic exposure meters and particularly to improvements in scale structures for exposure meters.

It is an object of the present invention to provide a novel photographic exposure meter in which the relation between the lens aperture and the exposure time may be directly read as a function of the light intensity and film speed, preferably with reference to an adjustable index.

It is a further object of the present invention to provide a photographic exposure meter which is easily readable, for which purpose there is provided in one section of respective scales two separate relatively movable rows of indicia one of which carries film speed indicia and the other of which carries light intensity indicia, the latter of which cooperates with a pointer deflected in accordance with the intensity of light; the other section of which carries two separate relatively movable rows of indicia, one of which carries indicia corresponding to lens aperture values and the other of which carries indicia for indicating exposure time values; and a movable index for fixing the relationship between the scales of the first-named section for obtaining the corresponding relation between the scales of the second-named section.

It is another object of this invention to provide means to easily and accurately read the relationship between the various constituents, e. g. film speed, focus-stop (lens aperture) and exposure time which have to be considered for conditioning correct and proper exposure for photographic films or plates.

It is still another object of the present invention to provide a very simple and handy device of the above nature which may be manipulated with one hand of the operator only and which is so constructed that its scales are very distinct and may be observed at a glance to obtain the desired relationship thereof.

Still a further object contemplates the provision of a photographic exposure meter having a needle or pointer actuatable by light controlled means and in which there are provided a casing having an opening for housing the light controlled means and the pointer, a transparent closure for said opening and a first indicia carrying means having a cutout for rendering visible the pointer or a portion thereof through said closure, whereby said pointer cooperates with an indicia portion on said carrying means, and another closure disposed over the first closure and including a transparent member, and a second indicia carrying means, the member provided with a mask having a window for rendering visible a portion of the indicia on the second carrying means, the indicia portions of the first and second carrying means being relatively adjustable upon movement of the second closure whereby at least a remainder of the indicia of the first and second carrying means are brought into registry.

Still another object of the invention is to provide a photographic exposure meter having a casing housing a pointer and light controlled means for actuating the same, the pointer being visible through the top of the casing and cooperable with a fixed scale indicating light intensity values which in turn is cooperable with a movable scale indicating film speed values, means for adjusting a predetermined relationship between said scales, there being further provided a scale indicating exposure time values fixed with relation to said film speed scale and cooperable with a scale fixed with said light intensity scale and indicating lens apertures.

This invention accordingly consists in the features of construction, combination of parts and in the unique relations of the members and in the relative proportioning and disposition thereof; all as more completely outlined herein.

To enable other skilled in the art so fully to comprehend the underlying features thereof that they may embody the same by the numerous modifications in structure and relation contemplated by this invention, a drawing depicting a certain form of the invention has been annexed as a part of this disclosure, and in such drawing, like characters of reference denote corresponding parts throughout all the views, of which Fig. 1 is a top plan view of a photographic exposure meter made in accordance with the invention;

Fig. 2 is an enlarged side view partially in section thereof;

Fig. 3 is a rear view of one of the transparent covers the same being partially broken away;

Fig. 4 is a fragmental sectional view taken along line 4—4 of Fig. 1;

Fig. 5 is a fragmental plan view of the cover in modified form.

Referring to the drawing there is disclosed a casing 10 of any suitable design and material. Pivotally mounted for horizontal oscillation within opening 10' of casing 10 in any conventional manner is a pointer 11 which may be actuated by conventional light controlled means (not shown). The casing 10 has an opening 13 in which a window 12 is provided through which light rays may enter to actuate said light controlled means for moving the pointer or needle 11.

Seated on an annular flange 14 of casing 10 is a plate made of suitable transparent material 15 providing a cover closing the opening 10' of the casing.

Secured to ledge 16 of casing 10 as for example by means of screws 17 is another plate or disc 18 provided with a cut-out 19 through which the indicating portion of pointer 11 is visible. Disc or plate 18 carries two scales, namely a field of markings 20 indicating light intensity values and another scale 21 indicating lens apertures or focus-stops (F). These scales are preferably arranged on opposite circumferential margins on one face of disc 18, as clearly shown in Fig. 1.

Scale 20 may be provided with conventional numerals indicated thereon in Fig. 1 or these numerals may be eliminated entirely as partially shown on the right hand side of the scale in Fig. 1. The shape of the light intensity or divisional markings is well known in the art. The arrangement of the indicia indicating focus-stops on scale 21 is also well known in the art.

In accordance with the invention a more efficient range and distribution thereof is provided. Located above plate or disc 18 is an annulus 22 provided with a retainer portion 24 rotatably fitting in an annular channel or groove 23 of casing 10. Seated on annulus 22 and loosely and frictionally fitted thereon is a transparent plate or disc 25, the flange 26 of retainer portion 24 retaining said disc 25 against the annulus 22 but permitting rotation of said disc 25 with respect thereto.

It can readily be seen from this construction that both, the disc 25 and annulus 22 may be simultaneously rotated or the disc 25 rotated relative to the annulus 22.

Arranged on annulus 22 and on opposite halves thereof are a scale 27 with indicia indicating film speed and a scale 30 with indicia indicating exposure time values. Scale 30, as shown in the drawing, carries exposure time values in terms of seconds and in terms of frames per second as well, for the use with a still camera and with a moving picture camera, respectively. It is to be understood, that the expression "exposure time" throughout the specification and claims is applicable to and covers either one or both said terms. On the disc 25 is an index 28 preferably substantially U-shaped providing between the arms a window 29 through which a desired portion of the scale 27 may be viewed as seen in Fig. 1.

The operation of the device is as follows:

The light rays corresponding to the intensity of light pass through opening 13 and will actuate through light controlled means (not shown) but well known in the art, pointer 11 to indicate on the scale 20 a light intensity value.

Assuming that it is desired to obtain the relation between lens aperture value and corresponding exposure time value for the given light intensity of the object to be photographed and assuming that the film speed value is 26 "Sch", then the disc 25 is rotated relative to annulus 22 until the index 28 is opposite the number 26 on the annulus as viewed through the window 29. Then both, the disc 25 and annulus 22 are simultaneously rotated until the index 28 is in registry with the light intensity value indicated by pointer 11 which intensity is shown as "10" in Fig. 1.

By thus moving annulus 22 with disc 25 in fixed relation to scale 20 the relation between the exposure time scale 30 on annulus 22 and the lens aperture values on scale 21 is brought about so that the user of the camera may obtain corresponding lens opening values and exposure time values; for example when the light intensity pointer 11 is at "10" and the user is employing a photographic film having a film speed of 26 "Sch", it is necessary for him to adjust the camera to, say, a focus-stop of 11 and one tenth of a second or he may choose 3,5 lens aperture and 1/250 of a second or any other relation between a focus-stop value and exposure time value thus obtained and indicated on the scales 30 and 21.

The numerals 1, 2, 3, 4, etc., representing the light intensity may be eliminated from the light intensity scale in order to reduce markings by numerals on the various scales and thereby increasing the ready readability on the device. This is indicated by the portion of the scale at the right hand of Fig. 1 of the drawing, where a portion of a field of divisional markings is shown.

In order to further reduce the visibility of indicia which are not employed for a particular reading the disc 25 may be provided with an opaque ring 31 and a window 32 for cooperation with the film speed scale on the annulus 22. This opaque ring 31 covers all the numerals of the values indicated on the film speed scale except the one to be used, in this example for instance 26.

In order to increase the friction and thereby retarding movement of annulus 22 there may be provided a friction member for instance screws or the like 33 positioned on the casing 10 and adjacent the circumference of said annulus 22.

From the foregoing description and from the drawing it can be readily seen, that there has been provided an apparatus having a movable pointer actuatable by light controlled means and a computing device, which comprises a stationary field of divisional markings, a first row of indicia in fixed relation to said field of markings, said field of markings and said row extending in opposed arcuate formation relative to each other and substantially surrounding the field of travel of the indicating portion of said pointer, and a substantially ring-shaped member arranged concentrically with and being rotatable around said field of markings and said first row and carrying substantially on opposite halves a second row of indicia and a third row of indicia, the ends of said divisional markings adjacent said pointer cooperable with said pointer, the ends of said divisional markings adjacent said ring-shaped member being cooperable with said second row of indicia, said first row of indicia being registrable with said third row of indicia.

From the foregoing description taken in connection with the accompanying drawing, it is apparent that an improved simple, practical and inexpensive device for the purpose intended is provided. It is apparent, however, that immaterial changes and modifications may be made by skilled persons without departing from the true spirit and scope of the invention as outlined in the appended claims. For instance, the arrangement of said scales may be made different and may vary in accordance with the purpose intended.

Having thus described my invention, what I claim as new and desire to secure by Letters Patent is:

1. A photographic exposure meter of the class described having a movable pointer actuatable by light controlled means and a computing device; comprising a non-movable field of divisional markings, a first row of indicia in fixed relation to said field of markings, said field of markings and said first row extending substantially along opposite halves of a circle encompassing the field of travel of the indicating portion of said pointer, and a substantially ring-shaped member rotatable around said circle and carrying substantially on opposite halves a second row of indicia and a third row of indicia, the ends of said divisional markings adjacent said pointer cooperating with said pointer, the ends of said divisional markings adjacent said ring-shaped member cooperating with said second row of indicia, said first row of indicia cooperating with said third row of indicia, one of said three rows of indicia indicating emulsion speed values, another of said rows indicating lens aperture values, and still another of said rows indicating exposure time values.

2. A photographic exposure meter having a movable pointer actuatable by light controlled means and a computing device; comprising a stationary field of divisional markings, a first row of indicia in fixed relation to said field of markings, said field of markings and said row extending in opposed arcuate formation relative to each other and substantially surrounding the field of travel of the indicating portion of said pointer, and a substantially ring-shaped member arranged concentrically with and being rotatable around said field of markings and said first row and carrying substantially on opposite halves a second row of indicia and a third row of indicia, the ends of said divisional markings adjacent said pointer cooperable with said pointer, the ends of said divisional markings adjacent said ring-shaped member being cooperable with said second row of indicia, said first row of indicia being registrable with said third row of indicia, one of said three rows of indicia indicating emulsion speed values, another of said rows indicating lense aperture values, and still another of said rows indicating exposure time values.

3. A photographic exposure meter having a movable pointer actuatable by light controlled means and a computing device; comprising a casing, a field of divisional markings, a first row of indicia, said field of markings and said first row being carried by said casing and extending in opposed arcuate formation relative to each other and substantially surrounding the field of travel of the indicating portion of said pointer, a substantially ring-shaped member arranged concentrically with and being rotatable around said field of markings and said first row and carrying substantially on opposite halves a second row of indicia and a third row of indicia, and a transparent plate covering said field of markings and said rows of indicia, the ends of said divisional markings adjacent said pointer cooperable with said pointer, the ends of said divisional markings adjacent said ring-shaped members cooperable with said second row of indicia, said first row of indicia being registrable with said third row of indicia, one of said three rows of indicia indicating emulsion speed values, another of said rows indicating lens aperture values, and still another of said rows indicating exposure time values.

4. A photographic exposure meter having a movable pointer actuatable by light controlled means and a computing device; comprising a casing, a field of divisional markings, a first row of indicia, said field of markings and said first row being carried by said casing and extending in opposed arcuate formation and substantially surrounding the field of travel of the indicating portion of said pointer, a substantially ring-shaped member arranged concentrically with and being rotatable around said field of markings and said first row and carrying substantially on opposite halves a second row of indicia and a third row of indicia, and a transparent plate encompassed by said member and covering said field of markings and said rows of indicia, said plate being provided with a mark, the ends of said divisional markings adjacent said pointer cooperable with said pointer, the ends of said divisional markings adjacent said ring-shaped member cooperable with said second row of indicia, said first row of indicia being registrable with said third row of indicia, one of said three rows of indicia indicating emulsion speed values, another of said rows indicating lens aperture values, and still another of said rows indicating exposure time values.

5. A photographic exposure meter having a movable pointer actuatable by light controlled means and a computing device; comprising a casing, a field of divisional markings, a first row of indicia, said field of markings and said first row being carried by said casing and extending in opposed arcuate formation and substantially surrounding the field of travel of the indicating portion of said pointer, a substantially ring-shaped member concentrically arranged with respect to said field of markings and said first row and rotatable therearound, said member carrying substantially on opposite halves a second row of indicia and a third row of indicia, and a transparent plate encompassed by said member and covering said field of markings and said rows of indicia, said plate being provided with a mark, the ends of said divisional markings adjacent said pointer cooperable with said pointer, said mark being cooperable with the ends of said divisional markings adjacent said member and with said second row of indicia, said first row of indicia being registrable with said third row of indicia, one of said three rows of indicia indicating emulsion speed values, another of said rows indicating lens aperture values, and still another of said rows indicating exposure time values.

6. A photographic exposure meter having a movable pointer actuatable by light controlled means and a computing device; comprising a casing, a field of divisional markings, a first row of indicia, said field of markings and said first row being carried by said casing and extending in opposed arcuate formation and substantially surrounding the field of travel of the indicating portion of said pointer, a substantially ring-shaped member concentrically arranged with respect to said field of markings and said first row and rotatable therearound, said member carrying substantially on opposite halves a second row of indicia and a third row of indicia, and a transparent plate rotatably supported by said member and positioned above said field of markings and said rows of indicia, said plate being provided with a mark, said member with said plate forming a closure for said casing, the ends of said divisional markings adjacent said pointer cooperable with said pointer, the ends of said divisional markings adjacent said member cooperable with said mark upon adjustment thereof on a selected indicia of said second row, said first row of indicia being registrable with said third row of indicia, one of said three rows of indicia indicating emulsion speed values, another of said rows indicating lens aperture values, and still another of said rows indicating exposure time values.

7. A photographic exposure meter having a movable pointer actuatable by light controlled means and a computing device; comprising a stationary field of divisional markings, a first row of indicia in fixed relation to said field, said field of markings and said row extending in opposed arcuate formation and substantially surrounding the field of travel of the indicating portion of said pointer, a substantially ring-shaped member concentrically arranged with respect to said field of markings and said first row and rotatable therearound, said member carrying substantially on opposite halves a second row of indicia and a third row of indicia, and a transparent plate provided with a mark and movably retained in said member, said mark having a frame-shaped portion for cooperation with an indicia of said second row of indicia and an indicator for cooperation with said field of markings, said divisional markings adjacent said pointer being cooperable with said pointer, said divisional markings adjacent said member being cooperable with said indicator, said first row of indicia being registrable with said third row of indicia, one of said three rows of indicia indicating emulsion speed values, another of said rows indicating lens aperture values, and still another of said rows indicating exposure time values.

8. A photographic exposure meter having a movable pointer actuatable by light controlled means and a computing device; comprising a stationary field of divisional markings, a first row of indicia in fixed relation to said field, said field of markings and said row extending in opposed arcuate formation and substantially surrounding the field of travel of the indicating portion of said pointer, a substantially ring-shaped member concentrically arranged with respect to said field of markings and said first row and rotatable therearound, said member carrying substantially on opposite halves a second row of indicia and a third row of indicia, and a transparent plate provided with a mark and movably retained in said member, said mark comprising a mask having a window, said divisional markings adjacent said pointer being cooperable with said pointer, said window being cooperable with said divisional markings adjacent said member and with said second row of indicia, said first row of indicia being registrable with said third row of indicia, one of said three rows of indicia indicating emulsion speed values, another of said rows indicating lens aperture values, and still another of said rows indicating exposure time values.

9. A photographic exposure meter having a movable pointer actuatable by light controlled means and a computing device; comprising a stationary field of divisional markings, a first row of indicia in fixed relation to said field, said field of markings and said row extending in opposed arcuate formation and having an opening therebetween, said field of markings and said row substantially surrounding the field of travel of the indicating portion of said pointer, said indicating portion being viewable through said opening, a substantially ring-shaped member concentrically arranged with respect to said field of markings and said first row and rotatable therearound, said member carrying substantially on opposite halves a second row of indicia and a third row of indicia, and a transparent plate frictionally and rotatably carried by said member and covering said field of markings and said rows of indicia, said plate being provided with a mark, said divisional markings adjacent said pointer being cooperable with said pointer, said divisional markings adjacent said member being cooperable with said mark upon adjustment thereof on a selected indicia of said second row of indicia, said first row of indicia being registrable with said third row of indicia, one of said three rows of indicia indicating emulsion speed values, another of said rows indicating lens aperture values, and still another of said rows indicating exposure time values.

10. A photographic exposure meter having a movable pointer actuatable by light controlled means and a computing device; comprising a stationary field of divisional markings indicating light values, a first row of indicia indicating lens apertures in fixed relation to said field of markings, said field of markings and said row extending in opposed arcuate formation and substantially surrounding the field of travel of the indicating portion of said pointer, a substantially ring-shaped member concentrically arranged with respect to said field of markings and said first row and rotatable therearound, said member carrying substantially on opposite halves a second row of indicia indicating film speeds and a third row of indicia indicating exposure times, a first transparent plate covering said pointer, and a second transparent plate encompassed by said member and positioned above said field of markings and said rows of indicia, said second plate being provided with a mark, said divisional markings adjacent said pointer being cooperable with said pointer, said mark being cooperable with said divisional markings adjacent said member and with said second row of indicia, said first row of indicia being registrable with said third row of indicia.

11. A photographic exposure meter having a movable pointer actuatable by light controlled means and a computing device; comprising a casing having a cavity, a first transparent plate in said cavity and covering said pointer, a stationary disc-shaped carrier having on opposed halves thereof a field of divisional markings and a first row of indicia, said carrier being positioned above said first plate and having a window between said field of markings and said first row to view said pointer therethrough, a rotatable ring-shaped member carrying a second row of indicia and a third row of indicia, and a second transparent plate provided with a mark, said second row and said third row being arranged concentrically with said field of markings and said first row and being positioned on opposed halves of said ring-shaped member, said second plate being positioned above said field of markings and said rows of indicia and being frictionally and rotatably engaged by said ring-shaped member, said divisional markings adjacent said pointer being cooperable with said pointer, said mark being cooperable with said divisional markings adjacent said ring-shaped member and with said second row of indicia, whereby upon adjustment of said mark on an indicia of said second row and on said field of markings registry of said indicia of said first row and of said third row is caused, one of said three rows of indicia indicating emulsion speed values, another of said rows indicating lens aperture values, and still another of said rows indicating exposure time values.

FRITZ LOEWENBERG.